United States Patent
Kwon et al.

(10) Patent No.: US 8,374,110 B2
(45) Date of Patent: Feb. 12, 2013

(54) APPARATUS AND METHOD FOR TRANSMITTING PACKET

(75) Inventors: Chang-Yeul Kwon, Yongin-si (KR); Jae-Min Lee, Suwon-si (KR); Guoping Fan, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 463 days.

(21) Appl. No.: 12/524,237

(22) PCT Filed: Jan. 23, 2008

(86) PCT No.: PCT/KR2008/000415
§ 371 (c)(1),
(2), (4) Date: Jul. 23, 2009

(87) PCT Pub. No.: WO2008/091108
PCT Pub. Date: Jul. 31, 2008

(65) Prior Publication Data
US 2010/0097967 A1     Apr. 22, 2010

Related U.S. Application Data

(60) Provisional application No. 60/886,148, filed on Jan. 23, 2007.

(30) Foreign Application Priority Data

Jan. 22, 2008   (KR) .................. 10-2008-0006789

(51) Int. Cl.
*H04B 7/00* (2006.01)
*H04L 12/66* (2006.01)
(52) U.S. Cl. ........................ 370/310; 370/352
(58) Field of Classification Search .................. None
See application file for complete search history.

(56) References Cited

U.S. PATENT DOCUMENTS

| | | |
|---|---|---|
| 2002/0034172 A1 | 3/2002 | Ho |
| 2002/0105938 A1* | 8/2002 | Suzuki ............................ 370/347 |
| 2005/0195821 A1 | 9/2005 | Yun et al. |
| 2006/0050709 A1* | 3/2006 | Sung et al. .................... 370/394 |
| 2006/0120341 A1 | 6/2006 | Del Prado Pavon et al. |
| 2006/0190610 A1 | 8/2006 | Motegi et al. |
| 2006/0195629 A1* | 8/2006 | Sharma et al. ................. 710/30 |
| 2007/0297375 A1* | 12/2007 | Bonta et al. ................... 370/338 |
| 2008/0225790 A1* | 9/2008 | Kupershmidt ................ 370/330 |
| 2010/0054139 A1* | 3/2010 | Chun et al. .................... 370/252 |

(Continued)

FOREIGN PATENT DOCUMENTS
KR   10-2006-0088507 A    8/2006

OTHER PUBLICATIONS

Fisher et al. "Millimeter-wave ad-hoc wireless access system. (2) Proposal of system architecture to IEEE 802.15 TG3s". Wireless Communication Technology, 2003, IEEE Topical Conference on. pp. 310-311.

(Continued)

*Primary Examiner* — John Blanton
(74) *Attorney, Agent, or Firm* — Sughrue Mion, PLLC

(57) ABSTRACT

Provided are an apparatus and method for transmitting a packet. The apparatus and method indicate a policy with respect to an acknowledgement packet and a retransmission packet, which correspond to the type of data to be transmitted, in a packet included in the data. The apparatus includes a Media Access Control (MAC) control unit which determines the type of packet to be transmitted, and sets the packet to indicate an acknowledgement policy and a retransmission policy with respect to the packet; and a communication unit which transmits the packet.

24 Claims, 7 Drawing Sheets

U.S. PATENT DOCUMENTS

2011/0044338 A1* 2/2011 Stahl et al. .................. 370/392

OTHER PUBLICATIONS

Xiao et al. "Optimal ACK mechanisms of the IEEE 802.15.3 MAC for ultra-wideband systems." IEEE Journal on Selected Areas in Communications, vol. 24, Iss. 4, Part 1, Apr. 2006, pp. 836-842.

"IEEE P802.15-05-0493-23-003c" http://www.ieee802.org/15/pub/TG3c.hmtl. Jan. 18, 2007.

Seiji Nishi et. al.: Millimeter-wave Ad-Hoc Wireless Access System-(4) Transceiver Technologies—2003 IEEE Topical Conference on Wireless Communication Technology, pp. 314-315.

Office Action dated Nov. 26, 2010, issued in corresponding Korean Patent Application No. 10-2008-0006789.

Communication dated Mar. 16, 2012 issued by the European Patent Office in counterpart European Application No. 08712176.0.

Communication dated Mar. 29, 2012 issued by the European Patent Office in counterpart European Application No. 08712176.0.

Liu, Xin, et al. "Adaptive Delayed Acknowledgement Algorithm for MPEG-4 Traffic in UWB Networks", Tsinghua Science and Technology, Jun. 2006, pp. 278-286. vol. 11, No. 4, Tsinghua University, Beijing, China.

* cited by examiner

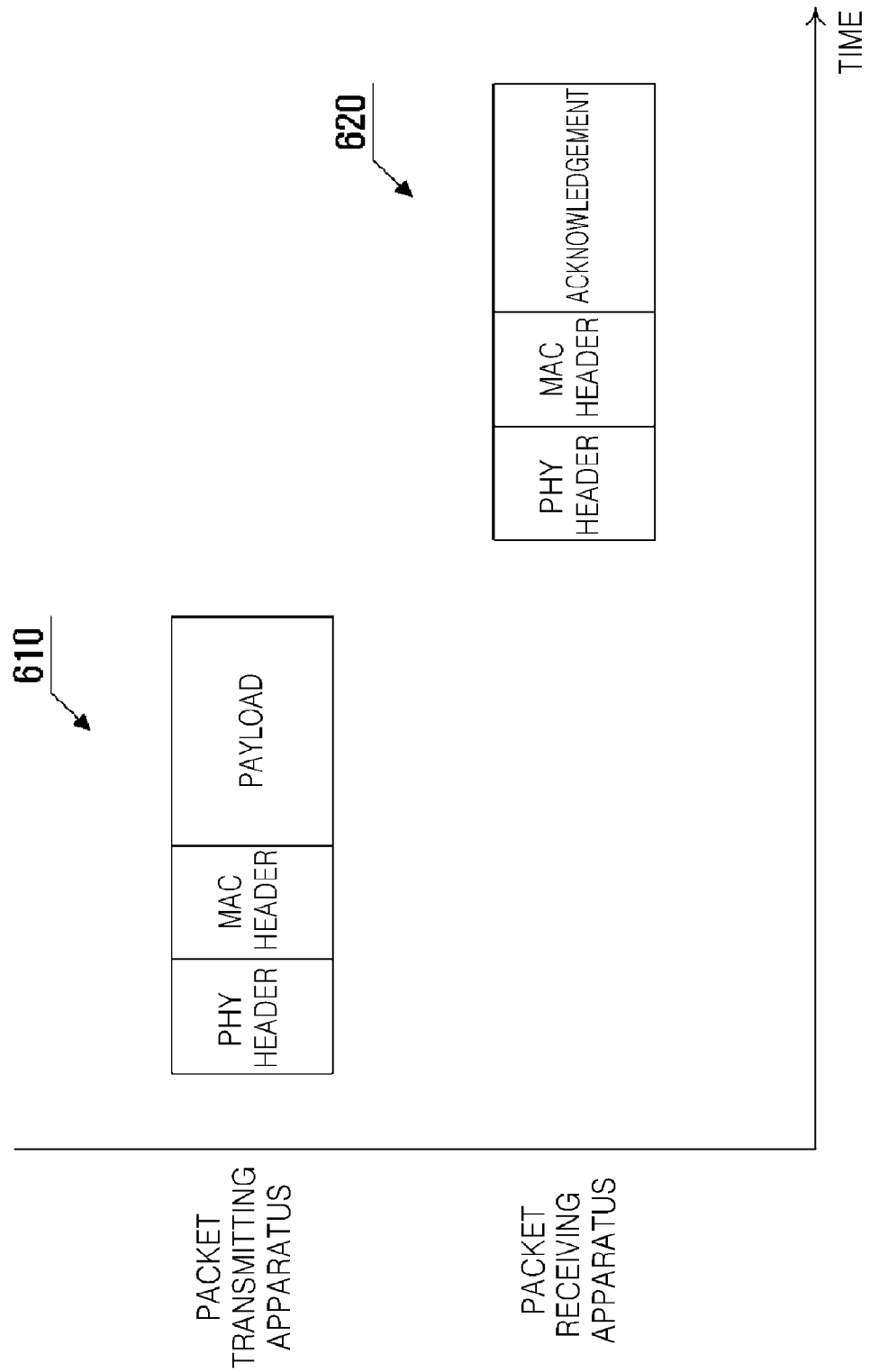

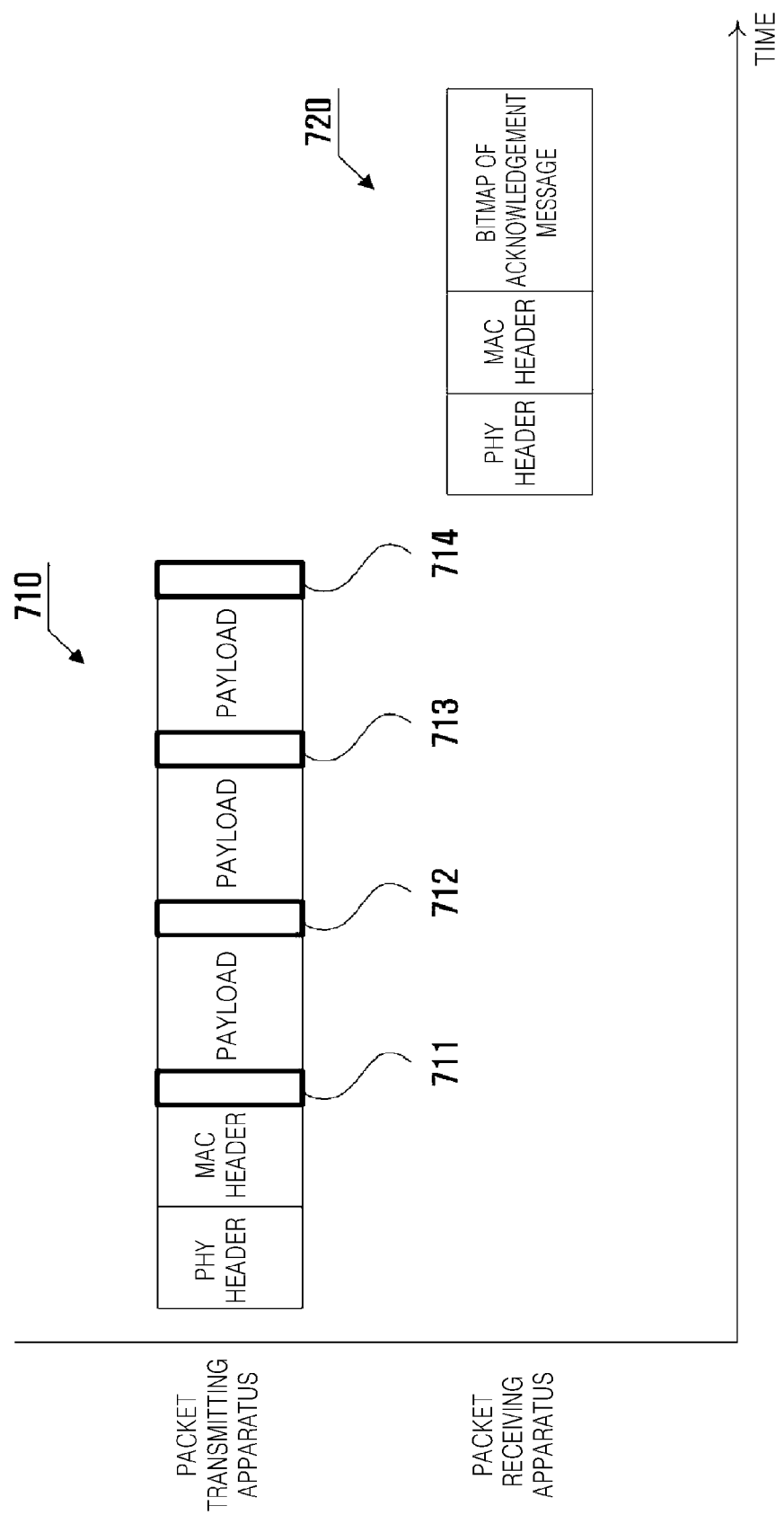

APPARATUS AND METHOD FOR TRANSMITTING PACKET

CROSS-REFERENCE TO RELATED PATENT APPLICATIONS

This application is a National Stage of International Application No. PCT/KR2008/000415 filed Jan. 23, 2008, and claims the benefit of Korean Patent Application No. 10-2008-0006789 filed on Jan. 22, 2008, in the Korean Intellectual Property Office, and U.S. Provisional Application No. 60/886,148 filed on Jan. 23, 2007, in the U.S. Patent and Trademark Office, the disclosures of which are incorporated herein in their entireties by reference.

BACKGROUND OF THE INVENTION

1. Field of the Invention

Apparatuses and methods consistent with the present invention relate to transmitting a packet, and more particularly, to an apparatus and method which indicate a policy with respect to a packet and transmit the packet, wherein the policy is in regard to an acknowledgement packet and a retransmission packet which correspond to the type of packet to be transmitted.

2. Description of the Related Art

There is an increasing demand for an efficient transmission method in a wireless network environment since the migration to wireless networks, and the need for massive amounts of multimedia data to be transmitted. Furthermore, there is an increasing necessity with respect to wireless transmitting of high quality video, such as digital video disk (DVD) images, high-definition television (HDTV) images, and the like, between various home devices.

A communication channel in the wireless network environment is easily affected by various external events, and thus, smooth data transmission is not guaranteed. Accordingly, a reception station, which has received data, transmits an acknowledgement packet for indicating that the data has been correctly received. A transmission station transmits next data after receiving the acknowledgement packet.

However, in the case where corrupted data is received, the reception station transmits the acknowledgement packet including a flag indicating that the data is corrupted, thereby enabling the transmission station to retransmit the corresponding data or to perform separate measures. Here, the acknowledgement packet has to be transferred to the transmission station within a predetermined period of time after the data is transmitted. Thus, if the transmission station does not receive the acknowledgement packet, the transmission station may recognize that a problem has occurred in transmission of the data, and may retransmit the corresponding data.

Multimedia data, such as video data or audio data, is data which is time-dependent. Thus, it is more important to transmit the data within a time flow rather than to retransmit the data that is corrupted or lost. For example, even if multimedia data 2, from among a plurality of pieces of multimedia data 1, 2, and 3 which are sequentially transmitted as a successive stream, is corrupted or lost, it may be preferable to transmit the multimedia data 3 at a scheduled time rather than to allocate a time to retransmit the multimedia data 2.

Also, due to the size of the multimedia data, the multimedia data requires allocation of much network resource. Thus, in the case where the multimedia data is retransmitted, wasteful use of network resource may occur.

Internet data which has payload corresponding to File Transfer Protocol (FTP) and Hyper Text Transfer Protocol (HTTP), and Media Access Control (MAC) commands are time-independent data due to their importance, thus, lossless transmission is more important.

In this manner, important matters in transmission of data may vary according to the type of the data, and thus, a method of utilizing a network according to the type of data is required.

SUMMARY OF THE INVENTION

An aspect of the present invention is to provide an apparatus and method for indicating a policy in a packet, wherein the policy is in regard to an acknowledgement packet and a retransmission packet which correspond to the type of packet to be transmitted.

Aspects of the present invention are not limited to the above described objective. Other aspects which are not mentioned will be clearly understood by one of ordinary skill in the art by referring to the descriptions below.

According to an aspect of the present invention, there is provided an apparatus for transmitting a packet, (hereinafter, referred to as 'a packet transmission apparatus') including a Media Access Control (MAC) control unit determining the type of packet to be transmitted, and setting the packet to indicate an acknowledgement policy and a retransmission policy with respect to the packet; and a communication unit transmitting the packet.

According to another aspect of the present invention, there is provided a method of transmitting a packet, the method including the operations of determining the type of packet to be transmitted, and setting the packet to indicate an acknowledgement policy and a retransmission policy with respect to the packet; and transmitting the packet.

BRIEF DESCRIPTION OF THE DRAWINGS

The above and other features and aspects of the present invention will become more apparent by describing in detail exemplary embodiments thereof with reference to the attached drawings in which:

FIG. 6 is a diagram of a case in which an acknowledgement packet is generated according to another embodiment of the present invention; and FIG. 7 is a diagram of a case in which a bitmap of an acknowledgement packet is generated according to another embodiment of the present invention.

DETAILED DESCRIPTION OF THE INVENTION

Figure 1:
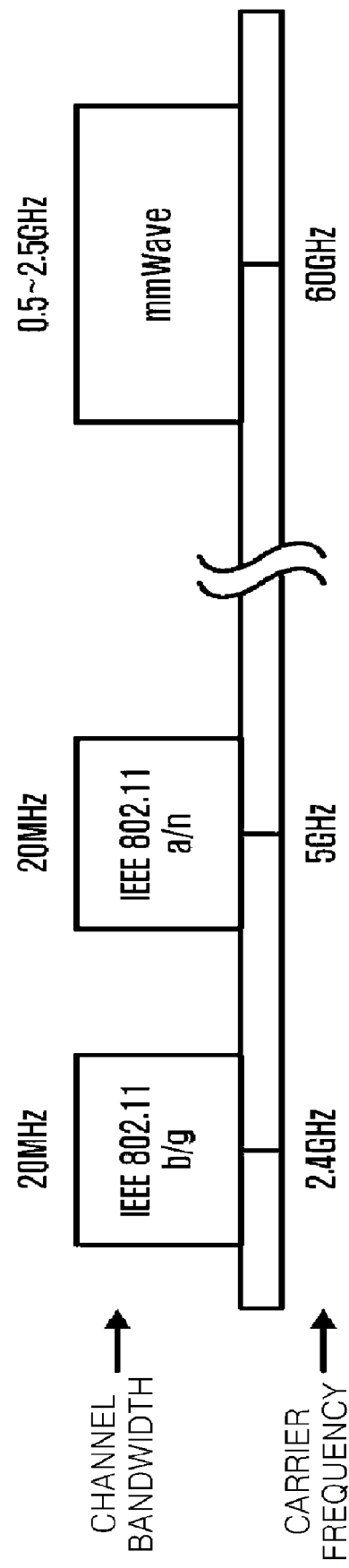
FIG. 1 is a diagram for comparing a frequency band between millimeter wave (mmWave) wireless technology and standards of the IEEE 802.11 series.

The present invention will now be described more fully with reference to the accompanying drawings, in which exemplary embodiments of the invention are shown. The exemplary embodiments of the invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. Therefore, the scope of the invention is defined by the appended claims. Like reference numerals in the drawings denote like elements, and thus their description will be omitted.

The term 'unit' in the embodiments of the present invention means a software component or hardware components such as a field-programmable gate array (FPGA) or an application-specific integrated circuit (ASIC), and performs a specific function. However, the term 'unit' is not limited to software or hardware. The 'unit' may be formed so as to be in a addressable storage medium, or may be formed so as to operate one or more processors. Thus, for example, the term 'unit' may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and 'units' may be associated with the smaller number of components and 'units', or may be divided into additional components and 'units'.

Hereinafter, the present invention will be described in detail by explaining exemplary embodiments of the invention with reference to the attached drawings.

802.15.3c, which is a task group of The Institute of Electrical and Electronics Engineers (The IEEE), is currently attempting to standardize a technology for transmitting massive amounts of data in a wireless home network. This technology, called millimeter wave (mmWave), uses a radio wave which has a length in mm as a physical wavelength to transmit the massive amounts of data, (that is, the radio wave has a frequency range of 30 gigahertz (GHz) through 300 GHz). Conventionally, this frequency range was an unlicensed band, and has been limitedly used by telecommunication businesses, radio wave astronomy, prevention of car crashes, or the like.

FIG. 1 is a diagram for comparing a frequency band between the mmWave and standards of the IEEE 802.11 series. The IEEE 802.11b or IEEE 802.11g uses a carrier frequency of 2.4 GHz, and has a channel bandwidth of 20 megahertz (MHz). Similarly, the IEEE 802.11a or IEEE 802.11n uses a carrier frequency of 5 GHz, and has a channel bandwidth of 20 MHz. On the other hand, the mmWave uses a carrier frequency of 60 GHz, and has a channel bandwidth of approximately 0.5 through 2.5 GHz. Thus, it is possible to understand that the mmWave has a carrier frequency and channel bandwidth which are much greater than the standards of the IEEE 802.11 series. In this manner, when a high frequency signal (the mmWave) having a wavelength in units of mm is used, a very high transmission rate of gigabits per second (Gbps) may be achieved and a single chip including an antenna may be implemented since the size of the antenna may be reduced to below 1.5 mm. Also, an attenuation ratio of the mmWave is very high in air, and thus, it is advantageous in that interference between each of a plurality of devices may be reduced.

In particular, recently, research with the aim of transmitting uncompressed audio data or uncompressed video data (hereinafter, referred to as 'uncompressed AV data') between each of a plurality of wireless devices by using a high bandwidth of the mmWave has been conducted. Compressed data is loosely compressed by means of removing parts which are less sensitive to human hearing and viewing, via motion compensation, discrete cosine transformation (DCT), quantization, variable length coding, and the like. On the other hand, uncompressed data losslessly includes a digital value (e.g., R, G, B components) indicating a pixel component. In this manner, since the wireless devices mutually transmit and receive original data which is not compressed, a user may be provided with multimedia contents having high quality images and high quality sound.

Figure 2:
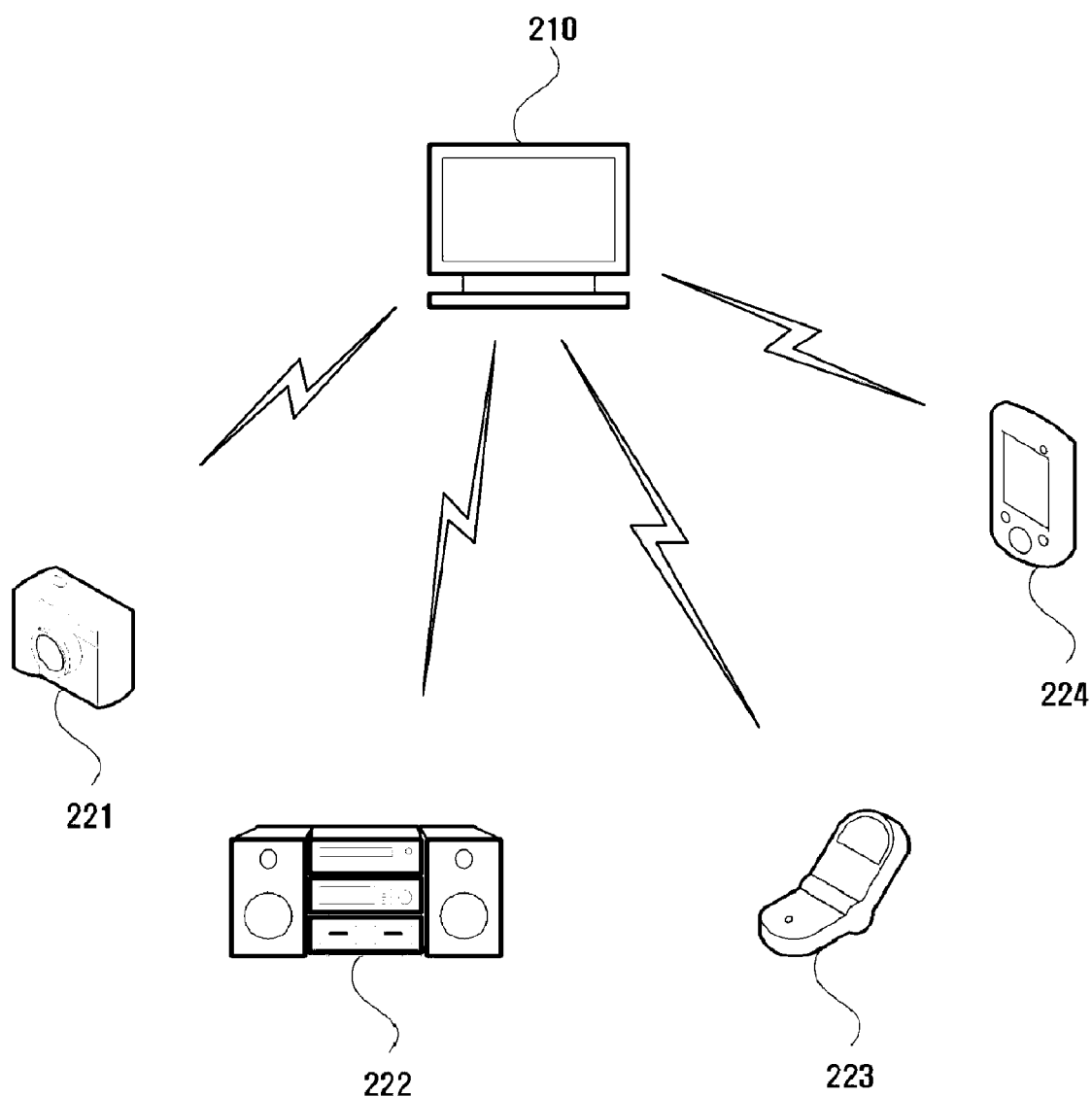
FIG. 2 is a diagram of a wireless network system according to an embodiment of the present invention.

FIG. 2 is a diagram of a wireless network system according to an embodiment of the present invention. The wireless network system includes a wireless network coordinator 210 and wireless network stations 221, 222, 223, and 224.

The wireless network coordinator 210 transmits a beacon, thereby coordinating bandwidth allocation with respect to the wireless network stations 221, 222, 223, and 224 which exist in the network. That is, one or more stations, from among the wireless network stations 221, 222, 223, and 224, which form the network, receive the beacon and wait to be allocated a bandwidth by referring to the received beacon. In the case where the bandwidth is allocated to one of the wireless network stations 221, 222, 223, and 224, that wireless network station which is allocated the bandwidth is enabled to transmit target data to another wireless network station via the allocated bandwidth.

The wireless network system according to the current embodiment is configured according to a super frame that includes at least one channel time block. The channel time block may be divided into a reserved channel time block and an unreserved channel time block, wherein the reserved channel time block is a reserved time period in which a bandwidth is allocated to a specific station in a network, and the unreserved channel time block is a time period in which the bandwidth is allocated to a station which is selected via a process of contention and which is from among stations in the network. Here, the channel time block means a certain time period in which data is transmitted and received between each of the stations in the network. The reserved channel time block and the unreserved channel time block respectively correspond to a channel time allocation period and a contention access period.

A station having data to be transmitted may contend against other stations in the unreserved channel time block, thereby enabling transmission of the data, or may transmit the data in the reserved channel time block that is allocated to the station.

The wireless network coordinator 210 and the wireless network stations 221, 222, 223, and 224 according to the current embodiment may have a plurality of physical means which are separate from each other, thereby enabling transmission and reception of a packet via each of the plurality of physical means which corresponds to the type of packet to be transmitted and received. For example, the plurality of physical means may be divided into a first physical means which transmits and receives data at a high transmission rate, and a second physical means which transmits and receives the data at a low transmission rate. The first physical means may transmit and receive the data via an mmWave communication channel which uses a carrier frequency of 60 GHz and has a channel bandwidth of 0.5 through 2.5 GHz, and the second physical means may transmit and receive the data via Bluetooth or a wireless local area network (LAN) that is a communication channel which uses a carrier frequency of 2.4 GHz or 5 GHz and has a channel bandwidth of 20 MHz.

Here, the plurality of physical means according to the present invention are divided into the first physical means and the second physical means. However, the present invention is not limited thereto and may also include three, four, or more pieces of physical means.

mmWave technology according to the present invention may include a standard of the European Computer Manufacturers Association (ECMA).

Omni-directional communication may be used to transmit the data by using the carrier frequency of 2.4 GHz or 5 GHz in the channel bandwidth of 20 MHz.

Meanwhile, according to the mmWave technology which enables the data to be transmitted by using the carrier frequency of 60 GHz in the channel bandwidth of 0.5 through 2.5 GHz, directional communication may be required. That is, antennas included in a transmission station and a reception station have to face each other so as to perform data communication. Accordingly, beam forming may be performed so as to synchronize direction of a radio wave.

Here, the beam forming may be performed so as to regulate the direction of the radio wave so that radio wave directions of the antennas included in the transmission and reception stations are synchronized. By doing so, data transmission and data reception may be smoothly performed in a high frequency band.

For wireless transmission of data, a carrier transmission technique is used, wherein the carrier transmission technique transmits a signal at a carrier frequency. The carrier transmission technique is divided into a single carrier transmission technique and a multicarrier transmission technique. Here, the single carrier transmission technique modulates an analogue signal or a digital baseband signal at a single carrier, and transmits the single carrier to a radio frequency (RF) band.

Meanwhile, since a communication technology evolves to digital communication, the single carrier transmission technique such as Amplitude Shift Keying (ASK), Quadrature Amplitude Modulation (QAM), and Frequency Shift Keying (FSK), which have been developed in terms of conventional analogue communication, may not simultaneously guarantee the amount of data transmission, and stability. In particular, in a wireless channel environment in which transmission power is limited, spectrum efficiency has become a highly important technical factor.

Accordingly, the wireless network stations 221, 222, 223, and 224 according to the current embodiment may transmit data by using the multicarrier transmission technique. In particular, the multicarrier transmission technique may include an Orthogonal Frequency Division Multiplexing (OFDM) technique and a Discrete Multi-Tone (DMT) method, wherein the OFDM technique increases the amount of data transmission by modulating and transmitting the data in parallel on a plurality of carriers which are sequentially arrayed. At this time, when an interval between each of the plurality of carriers which are transmitted in parallel is synchronized with a data transmission rate of a symbol and is arrayed, an interference between each of the plurality of carriers may be minimized or removed so that a signal of each of the plurality of carriers can be easily and independently separated.

Figure 3:
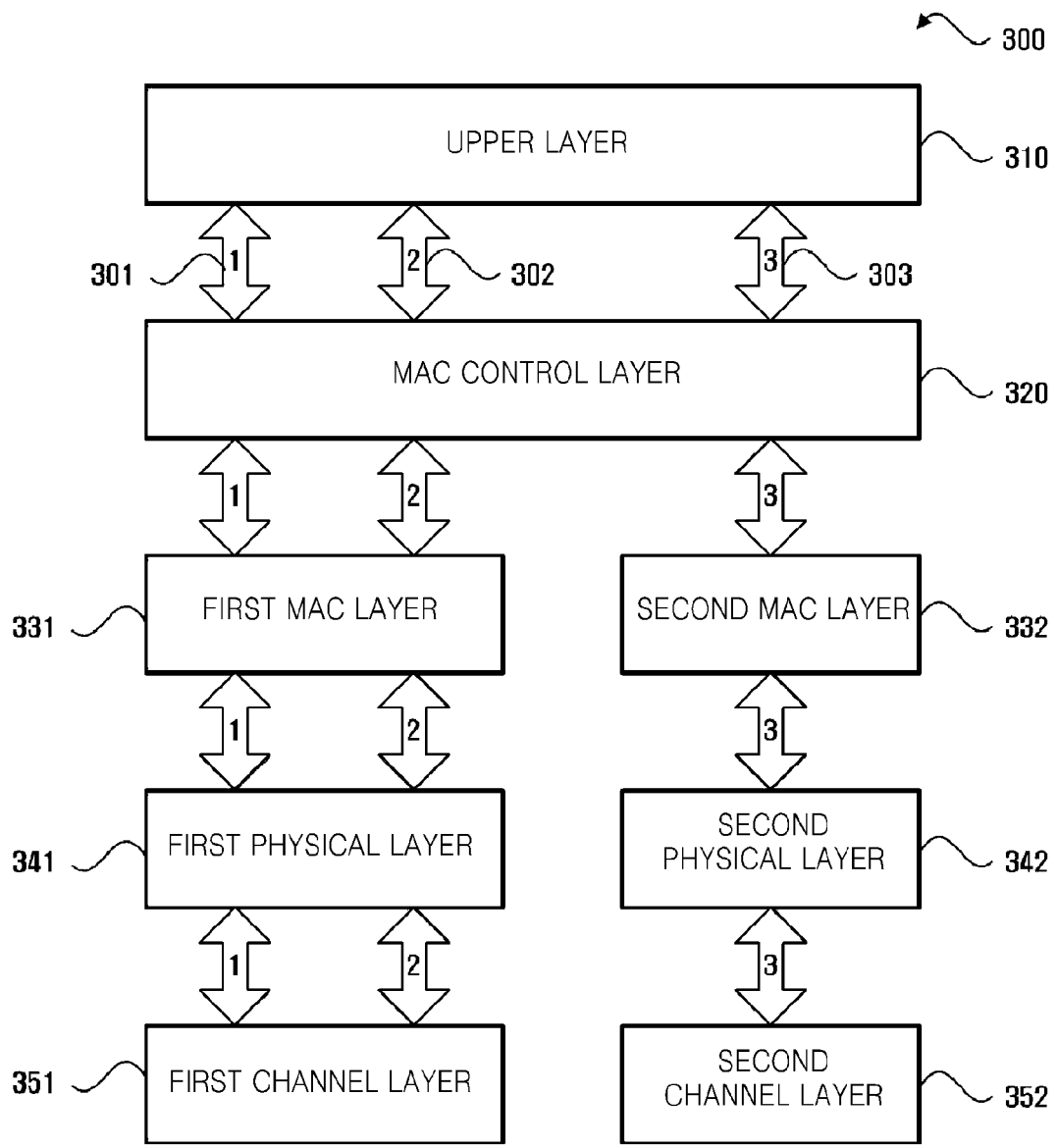
FIG. 3 is a diagram of a communication layer according to another embodiment of the present invention.

FIG. 3 is a diagram of a communication layer 300 according to another embodiment of the present invention. In general, the communication layer 300 is sequentially formed of first and second channel layers 351 and 352, at a bottom, which indicate physical mediums at a predetermined frequency band to which a wireless signal is transmitted, first and second physical layers 341 and 342 which indicate an RF layer (not shown) and a baseband layer (not shown), first and second Media Access Control (MAC) layers 331 and 332, a MAC control layer 320, and a upper layer 310. Here, the upper layer 310 may be a layer above the first and second MAC layers 331 and 332, and may include a Logical Link Control (LLC) layer, a network layer, a transport layer, an application layer, and the like.

As described above, the wireless network coordinator 210 and the wireless network stations 221, 222, 223, and 224 according to the previous embodiment of the present invention may have the plurality of physical means which are separate from each other. Accordingly, a MAC layer, a physical layer, and a channel layer which correspond to each of the plurality of physical means may separately exist.

That is, the first MAC layer 331, the first physical layer 341, and the first channel layer 351 which correspond to the first physical means may be included in the wireless network stations 221, 222, 223, and 224, and the second MAC layer 332, the second physical layer 342, and the second channel layer 352 which correspond to the second physical means may be included in the wireless network stations 221, 222, 223, and 224.

Thus, according to the type of packet, the packet may be processed via a path of the first physical means, or may be processed via a path of the second physical means.

According to the type of packet, the packet includes packet including multimedia data such as video data or audio data, a time-dependent packet, and a time-independent packet.

Here, the time-dependent packet represents a packet that has to be rapidly transferred due to its high priority. The time-independent packet represents a packet that is allowed to be transferred relatively late due to its low priority.

The time-dependent packet includes at least one of an acknowledgement packet with respect to data transmission and a packet for controlling an application program. The time-independent packet includes at least one of an association request packet for requesting an association with a network, a response packet with respect to the association request packet, a band request packet for requesting a frequency band for transmitting and receiving data in a network, and a response packet with respect to the band request packet.

FIG. 3 illustrates three data process paths 301, 302, and 303. The first data process path 301 indicates a path for processing the packet including the multimedia data, the second data process path 302 indicates a path for processing the time-dependent packet, and the third data process path 303 indicates a path for processing the time-independent packet. Here, the packet including the multimedia data, and the time-dependent packet have a high priority, and thus, these packets are processed via the first and second data process paths 301 and 302 of the first physical means. On the other hand, the time-independent packet has a low priority, and thus, this packet is processed via the third data process path 303 of the second physical means.

The MAC control layer 320 controls the three data process paths 301, 302, and 303 with respect to the packet. That is, the MAC control layer 320 controls the high priority packet to be processed via the first and second data process paths 301 and 302 of the first physical means, and controls the low priority packet to be processed via the third data process path 303 of the second physical means.

Figure 4:
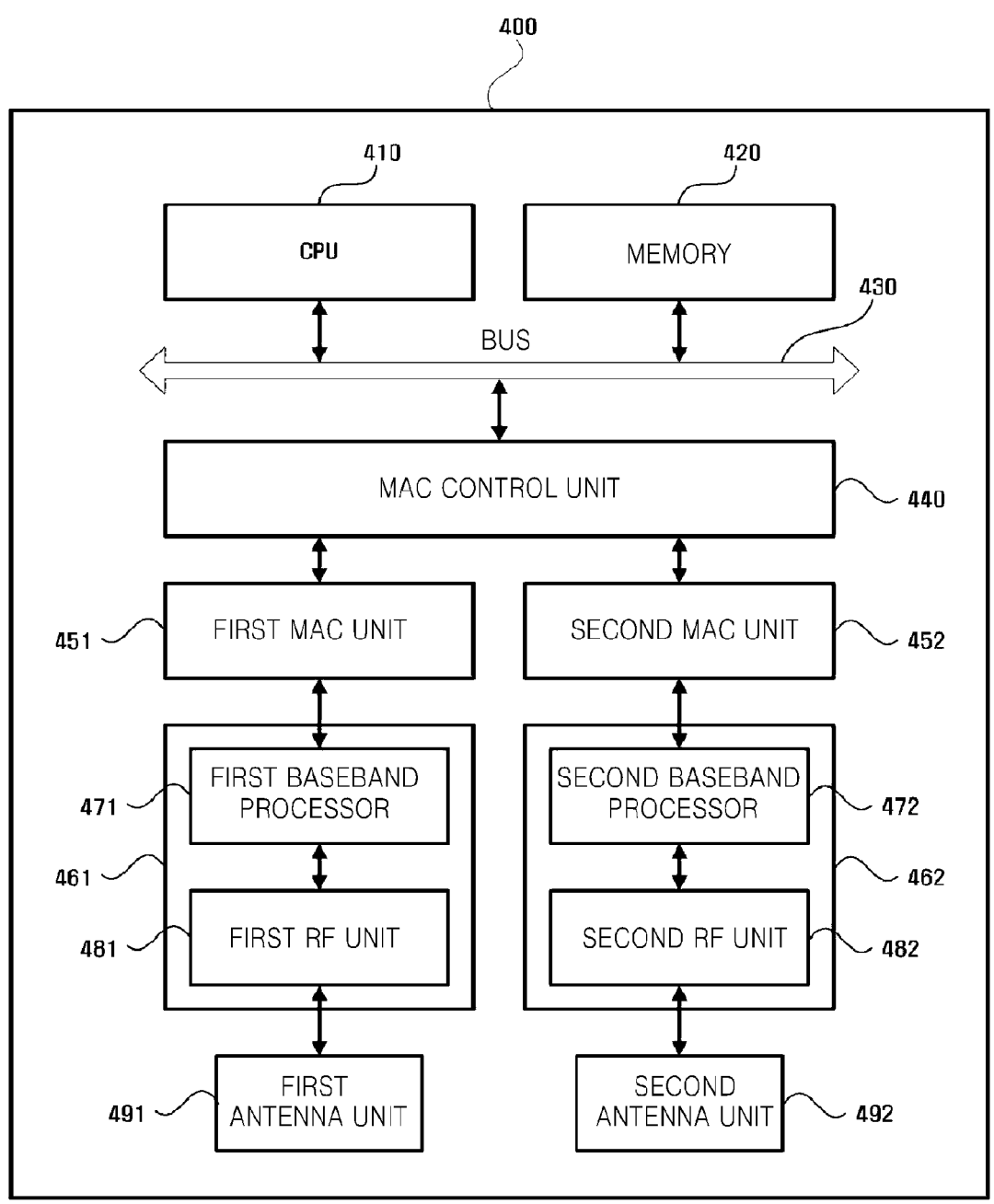
FIG. 4 is a block diagram of an apparatus for transmitting a packet according to another embodiment of the present invention.

FIG. 4 is a block diagram of an apparatus for transmitting a packet according to another embodiment of the present invention. The apparatus for transmitting the packet (hereinafter, referred to as 'a packet transmission apparatus 400') includes a central processing unit (CPU) 410, a memory 420, a MAC control unit 440, a first MAC unit 451, a second MAC unit 452, a first physical unit 461, a second physical unit 462, a first antenna unit 491, and a second antenna unit 492.

In addition, the packet transmission apparatus 400 according to the current embodiment may be an apparatus which serves to be a wireless network coordinator in a network, or an apparatus which operates as a wireless network station in the network.

The CPU 410 controls other components which are connected to a bus 430, and processes an operation of the upper layer 310 in FIG. 3. Thus, the CPU 410 processes received data (a received MAC Service Data Unit (MSDU)) provided from the first and second MAC units 451 and 452, or generates transmission data (a transmission MSDU), thereby providing the first and second MAC units 451 and 452 with the transmission data.

The memory 420 stores data. Here, the data includes uncompressed AV data. Examples of the memory 420 are a hard disk drive (HDD), a flash memory, a compact flash (CF) card, a secure digital (SD) card, a smart media (SM) card, a multimedia card (MMC), a memory stick, and the like. The memory 420 is a module which is enabled to input and output information, and may be equipped inside the packet transmission apparatus 400 or may be equipped in a separate device. In the case where the memory 420 is equipped in the separate device, communication units 461 and 462 may communicate with the separate device, thereby enabling transmission and reception of the data.

The first and second MAC units 451 and 452 add a MAC header to the transmission MSDU, that is, the transmission data provided from the CPU 410, and generate a MAC protocol data unit (MPDU). Here, the high priority multimedia data and time-dependent packet may be generated by the first MAC unit 451, and the low priority time-independent packet may be generated by the second MAC unit 452.

The communication units 461 and 462 serve to transform the MPDU, which is generated by the first and second MAC units 451 and 452, into a wireless signal, and to transmit the wireless signal via a communication channel. For this, the communication units 461 and 462 respectively include first and second baseband processors 471 and 472, and RF units 481 and 482, and are respectively connected to the first and second antenna units 491 and 492. Here, the first and second antenna units 491 and 492 may include at least one antenna. Examples of the antenna are a directional antenna such as a single antenna, a switch antenna, and a phased array antenna, or an unidirectional antenna such as a turnstile antenna, a super gain antenna, a helical antenna, or a stacked coaxial antenna.

The first and second baseband processors 471 and 472 receive the MPDU generated by the first and second MAC units 451 and 452, and add a signal field and a preamble to the MPDU, thereby generating a physical protocol data unit (PPDU). Then, the RF units 481 and 482 transform the generated PPDU into the wireless signal, and transmit the wireless signal via the first and second antenna units 491 and 492.

According to a packet process path taken by the MAC control unit 440, a first physical unit 461 transmits the packet including the multimedia data and the time-dependent packet, and a second physical unit 462 transmits the time-independent packet.

The MAC control unit 440 determines the type of packet to be transmitted, and sets the packet to indicate an acknowledgement policy and a retransmission policy with respect to the packet.

The packet includes a packet (hereinafter, referred to as 'a first packet') which includes the multimedia data, a packet (hereafter, referred to as 'a second packet') which includes internet data, and a packet (hereinafter, referred to as 'a third packet') which includes a MAC command. Here, the multimedia data includes data only including video, data only including audio, or data including the video and the audio. Also, the MAC command includes a network association request, a response to the network association request, a handover request, a response to the handover request, a network information request, a response to the network information request, a band request, a response to the band request, and the like.

The first packet is time-dependent data for which it is more important to be transmitted at a scheduled time rather than to be retransmitted with respect to a corrupted or lost packet. Thus, when the MAC control unit 440 sets the packet, the MAC control unit 440 may set the first packet so that generation of the acknowledgement packet with respect to the first packet is restricted. Accordingly, a packet receiving apparatus, which has received the first packet, does not transmit the acknowledgement packet for indicating that the first packet is correctly received, or for indicating that the first packet has an error.

Also, the MAC control unit 440 may insert a bit, which indicates that retransmission with respect to the first packet is restricted, into the first packet. That is, the first packet is a packet that is not retransmitted, and thus, after a first packet is transmitted, retransmission with respect to the corresponding first packet is not performed but a next first packet is transmitted. Accordingly, the packet receiving apparatus cannot request the retransmission even if the received first packet has an error.

Meanwhile, the second and third packets are time-independent data due to their importance, thus, lossless transmission is more important. Therefore, when the MAC control unit 440 sets the packet, the MAC control unit 440 may set a second packet or a third packet so that the acknowledgement packet with respect to the second packet or the third packet is generated. Accordingly, the packet receiving apparatus, which has received the second packet or the third packet, transmits the acknowledgement packet when the second packet or the third packet is correctly received and when the second packet or the third packet is received, having an error therein.

Here, the type of acknowledgement packet which is transmitted by the packet receiving apparatus, may vary according to a policy shown in the second packet or the third packet. That is, the MAC control unit 440 may set the second packet or the third packet so that an immediate acknowledgement packet or a bitmap of the acknowledgement packet is generated according to the number of payloads included in the second packet or the third packet.

In the case where the second packet or the third packet is set to allow the immediate acknowledgement packet, the packet receiving apparatus transmits the immediate acknowledgement packet as soon as the second packet or the third packet is received. In the case where the second packet or the third packet is set to allow transmission of a bitmap of the acknowledgement packet, the packet receiving apparatus checks a reception status of each payload included in the second packet or the third packet, and forms the bitmap indicating the reception status of each payload, thereby transmitting the bitmap of the acknowledgement packet.

The MAC control unit 440 may insert a bit, which indicates that retransmission with respect to the second packet or the third packet is performed, into the second packet or the third packet. That is, the second packet or the third packet is a packet to be retransmitted, and thus, when the packet receiving apparatus requests a packet to be retransmitted, the packet transmission apparatus 400 retransmits an original packet corresponding to the packet. Therefore, in the case where the received second packet or the received third packet has the error, the packet receiving apparatus may request the retransmission with respect to the received second packet or the received third packet.

Also, the MAC control unit 440 may insert the allowed number of times the retransmission may be performed, into the second packet or the third packet. Accordingly, the packet receiving apparatus may request the retransmission within the allowed number of times.

Figure 5:
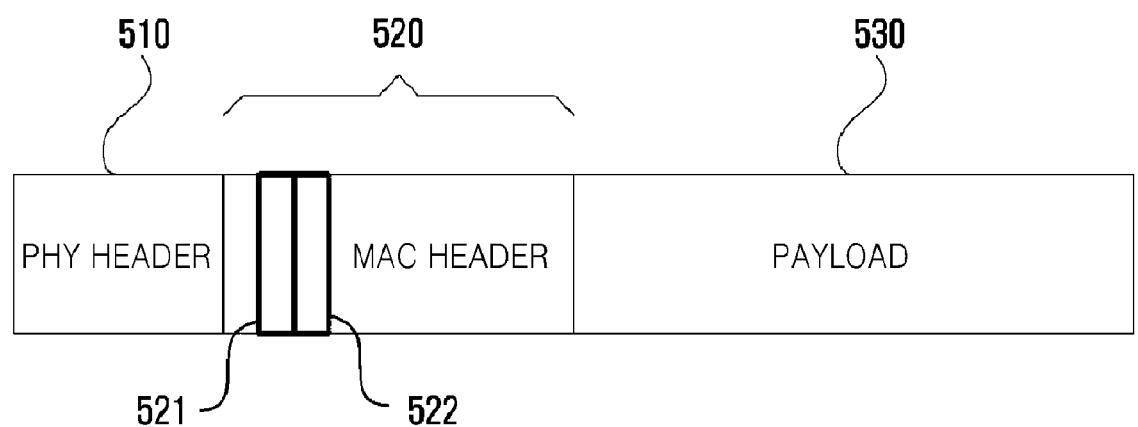
FIG. 5 is a diagram for illustrating a structure of a packet according to another embodiment of the present invention.

When the MAC control unit 440 sets the packet, the MAC control unit 440 may set the acknowledgement policy and the retransmission policy in the MAC header of the packet. In this regard, FIG. 5 is a diagram for illustrating a structure of the packet according to another embodiment of the present invention.

The packet includes a PHY header 510, a MAC header 520, and a payload 530. The MAC header 520 may include an acknowledgement policy field 521 and a retransmission policy field 522.

The acknowledgement policy field 521 may include information about whether an acknowledgement packet is allowed to be transmitted, and information about the type of acknowledgement packet (an immediate acknowledgement packet and a bitmap of the acknowledgement packet).

The retransmission policy field 522 shows whether a packet retransmission is performed. For example, when a bit having a value of 0 is inserted in the retransmission policy field 522, this represents that the retransmission packet may not be transmitted. When a bit having a value of 1 is inserted in the retransmission policy field 522, this represents that the retransmission packet may be transmitted.

FIG. 6 is a diagram of a case in which an acknowledgement packet is generated according to another embodiment of the present invention. That is, FIG. 6 corresponds to the case in which there is one payload, and thus, the MAC control unit 440 of the packet transmission apparatus 400 indicates the fact that transmission of the immediate acknowledgement packet is allowed, in the acknowledgement policy field 521. At this time, when a packet 610 is received, the packet receiving apparatus checks a reception status of the packet 610 and transmits an acknowledgement packet 620 corresponding to the reception status. At this time, in the case where the packet transmission apparatus 400 receives the acknowledgement packet 620 indicating that there was an error during the transmission of the packet 610, the packet transmission apparatus 400 may retransmit an original packet corresponding to the packet 610, according to the retransmission policy.

Meanwhile, in the case where there are a plurality of payloads included in a packet, the MAC control unit 440 may indicate the fact that transmission of a bitmap of an acknowledgement packet is allowed, in the acknowledgement policy field 521. In this regard, FIG. 7 is a diagram of a case in which the bitmap of the acknowledgement packet is generated according to another embodiment of the present invention.

In the case where a packet 710 includes a plurality of payloads, the first and second MAC units 451 and 452 may insert separators 711, 712, 713, and 714 into the packet 710 so that the plurality of payloads may be differentiated. The packet receiving apparatus checks a reception status of each of the plurality of payloads by referring to the separators 711, 712, 713, and 714, and forms a bitmap 720 showing the reception status of each of the plurality of payloads, and then transmits the bitmap 720 to the packet transmission apparatus 400. At this time, in the case where the bitmap 720 of the acknowledgement packet indicates a corrupted payload, the packet transmission apparatus 400 may retransmit the packet 710 including an original packet, which corresponds to the corrupted payload, according to the retransmission policy.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

The apparatus and method for transmitting the packet according to exemplary embodiments of the present invention, have one or more effects as described below.

First, a policy with respect to an acknowledgement packet and a retransmission packet, which correspond to the type of packet to be transmitted, is indicated in the packet so that a reception station can recognize whether the acknowledgement packet is allowed to be transmitted and the packet retransmission is performed. Therefore, it is advantageous in that unnecessary operations by the reception station are prevented.

Second, transmission and reception with respect to an unnecessary packet is restricted, thus, it is advantageous in that a waste of network resource is prevented.

The invention claimed is:

1. A packet transmission apparatus for transmitting a packet, the packet transmission apparatus comprising;
a Media Access Control (MAC) control unit which determines a type of packet to be transmitted, and sets the packet to indicate an acknowledgement policy and a retransmission policy with respect to the packet; and
a communication unit which transmits the packet,
wherein the acknowledgement policy comprises information about whether an acknowledgement packet is allowed to be transmitted, and the retransmission policy indicates whether a packet retransmission is performed,
wherein the packet comprises a time-dependent packet and a time-independent packet,
wherein the MAC control unit sets the time-dependent packet so an acknowledgment packet with respect to the time-dependent packet is not generated,
wherein the MAC control unit inserts a bit into the time-dependent packet, and wherein the bit indicates that retransmission of the time-dependent packet is prohibited, and
wherein the MAC control unit sets the time-independent packet so an acknowledgment packet with respect to the time-independent packet is generated.

2. The packet transmission apparatus of claim 1, wherein the communication unit transmits the packet in a carrier frequency band of one of 2.4 GHz (gigahertz), 5 GHz, and 60 GHz.

3. The packet transmission apparatus of claim 1, wherein the packet comprises a first packet of multimedia data, a second packet of Internet data, and a third packet of a MAC command.

4. The packet transmission apparatus of claim 3, wherein the MAC control unit sets the first packet so an acknowledgement packet with respect to the first packet is not generated.

5. The packet transmission apparatus of claim 3, wherein the MAC control unit inserts a bit into the first packet, and wherein the bit indicates that retransmission of the first packet is prohibited.

6. The packet transmission apparatus of claim 3, wherein the MAC control unit sets the second packet or the third packet so an acknowledgement packet with respect to the second packet or the third packet is generated.

7. The packet transmission apparatus of claim 6, wherein the MAC control unit sets the second packet or the third packet so an immediate acknowledgement packet or a bitmap of the acknowledgement packet is generated according to a number of payloads in the second packet or the third packet.

8. The packet transmission apparatus of claim 3, wherein the MAC control unit inserts a bit into the second packet or the third packet, wherein the bit indicates that retransmission of the second packet or the third packet is not prohibited.

9. The packet transmission apparatus of claim 8, wherein the MAC control unit inserts a number of times the retransmission is allowed to be performed, into the second packet or the third packet.

10. The packet transmission apparatus of claim 1, wherein the MAC control unit sets the acknowledgement policy and the retransmission policy in a MAC header of the packet.

11. A method of transmitting a packet, the method comprising:
    determining a type of packet to be transmitted, and setting the packet to indicate an acknowledgement policy and a retransmission policy with respect to the packet; and
    transmitting the packet,
    wherein the acknowledgement policy comprises information about whether an acknowledgement packet is allowed to be transmitted, and the retransmission policy indicates whether a packet retransmission is performed,
    wherein the packet comprises a time-dependent packet and a time-independent packet,
    wherein the setting of the packet comprises setting the time-dependent packet so an acknowledgment packet with respect to the time-dependent packet is not generated,
    wherein the setting of the packet comprises inserting a bit into the time-dependent packet, wherein the bit indicates that retransmission with of the time-dependent packet is prohibited, and
    wherein the setting of the packet comprises setting the time-independent packet so an acknowledgment packet with respect to the time-independent packet is generated.

12. The method of claim 11, wherein the transmitting of the packet comprises transmitting the packet in a carrier frequency band of one of 2.4 GHz, 5 GHz, and 60 GHz.

13. The method of claim 11, wherein the packet comprises a first packet of multimedia data, a second packet of Internet data, and a third packet of a Media Access Control (MAC) command.

14. The method of claim 13, wherein the setting of the packet comprises setting the first packet so an acknowledgement packet with respect to the first packet is not generated.

15. The method of claim 13, wherein the setting of the packet comprises inserting a bit into the first packet, wherein the bit indicates that retransmission with of the first packet is prohibited.

16. The method of claim 13, wherein the setting of the packet comprises setting the second packet or the third packet so an acknowledgement packet with respect to the second packet or the third packet is generated.

17. The method of claim 16, wherein the setting of the packet comprises setting the second packet or the third packet so an immediate acknowledgement packet or a bitmap of the acknowledgement packet is generated according to a number of payloads in the second packet or the third packet.

18. The method of claim 13, wherein the setting of the packet comprises inserting a bit into the second packet or the third packet, wherein the bit indicates that retransmission with respect to the second packet or the third packet is not prohibited.

19. The method of claim 18, wherein the setting of the packet comprises inserting a number of times the retransmission is allowed to be performed, into the second packet or the third packet.

20. The method of claim 11, wherein the setting of the packet comprises setting the acknowledgement policy and the retransmission policy in a Media Access Control (MAC) header of the packet.

21. A method of transmitting a packet, the method comprising:
    setting an acknowledgement policy and a retransmission policy for a first packet, based on whether the first packet is time-dependent or time-independent;
    inserting information regarding the set acknowledgement policy and the set retransmission policy into the first packet to generate a second packet; and
    transmitting by a transmitting device, the second packet,
    wherein the acknowledgement policy comprises information about whether an acknowledgement packet is allowed to be transmitted, and the retransmission policy indicates whether a packet retransmission is performed,
    wherein the setting of the first packet comprises setting the first packet so an acknowledgment packet with respect to the first packet is not generated, when the first packet is time-dependent,
    wherein the setting of the first packet comprises inserting a bit into the first packet,
    wherein the bit indicates that retransmission with of the first packet is prohibited, when the first packet is time-dependent, and
    wherein the setting of the packet comprises setting the first packet so an acknowledgment packet with respect to the first packet is generated, when the first packet is time-independent.

22. The method of claim 21, wherein a receiving device receives the transmitted second packet and wherein the setting the acknowledgement policy and the retransmission policy is based on whether the first packet is time-dependent or time-independent.

23. The method of claim 22, wherein if the first packet is time-dependent, the acknowledgement policy is set so the receiving device does not transmit an acknowledgement and the retransmission policy is set so the receiving device does not request retransmission of the second packet from the transmitting device.

24. The method of claim 23, wherein the first packet that is time-dependent is of greater priority than the first packet that is time-independent.

* * * * *

UNITED STATES PATENT AND TRADEMARK OFFICE
CERTIFICATE OF CORRECTION

PATENT NO. : 8,374,110 B2
APPLICATION NO. : 12/524237
DATED : February 12, 2013
INVENTOR(S) : Chang-Yeul Kwon et al.

Page 1 of 1

It is certified that error appears in the above-identified patent and that said Letters Patent is hereby corrected as shown below:

Title Page, Section (75), Inventors: insert -- KIM, Seong-soo, Seoul (KR) --

Signed and Sealed this
Ninth Day of April, 2013

Teresa Stanek Rea
*Acting Director of the United States Patent and Trademark Office*